US012528677B2

(12) United States Patent
Schürmann et al.

(10) Patent No.: US 12,528,677 B2
(45) Date of Patent: Jan. 20, 2026

(54) EMERGENCY-OPERATION VALVE BLOCK FOR A MOBILE CRANE

(71) Applicant: MANITOWOC CRANE GROUP FRANCE SAS, Dardilly (FR)

(72) Inventors: Johannes Schürmann, Jever (DE); Thomas Schmithüsen, Schortens (DE); Verena Bohmann, Wardenburg (DE); Harald Wiesner, Wangerland (DE)

(73) Assignee: MANITOWOC CRANE GROUP FRANCE SAS, Dardilly (FR)

( * ) Notice: Subject to any disclaimer, the term of this patent is extended or adjusted under 35 U.S.C. 154(b) by 271 days.

(21) Appl. No.: 18/354,416

(22) Filed: Jul. 18, 2023

(65) Prior Publication Data

US 2024/0034601 A1 Feb. 1, 2024

(30) Foreign Application Priority Data

Jul. 28, 2022 (EP) .................................... 22187446

(51) Int. Cl.
*B66C 23/90* (2006.01)
*B66C 13/20* (2006.01)
(Continued)

(52) U.S. Cl.
CPC .............. *B66C 23/90* (2013.01); *B66C 13/20* (2013.01); *B66C 23/88* (2013.01); *F15B 13/0832* (2013.01); *F15B 20/002* (2013.01)

(58) Field of Classification Search
CPC ......... B66C 15/00; B66C 23/88; B66C 23/90; B66C 13/20; F15B 13/0842; F15B 20/002; F15B 20/004
See application file for complete search history.

(56) References Cited

U.S. PATENT DOCUMENTS 2,984,985 A 5/1961 Macmillan
6,679,281 B1 * 1/2004 Thiry ...................... F15B 1/024 137/118.06
(Continued)

FOREIGN PATENT DOCUMENTS

CN 204127005 U 1/2015
CN 111039183 A 4/2020
(Continued)

OTHER PUBLICATIONS

EPO Search Report and Written Opinion dated Jan. 24, 2023, issued in connection with corresponding EP Appl. No. 22 187 446.
(Continued)

*Primary Examiner* — Thomas E Lazo
(74) *Attorney, Agent, or Firm* — Cook Alex Ltd.

(57) ABSTRACT

An emergency-operation valve block includes: a drive port for hydraulically connecting the valve block to an emergency drive of a mobile crane, at least two drive mechanism ports for hydraulically connecting the valve block to one drive mechanism of the mobile crane each, at least two closing valves which are assigned to one of the drive mechanism ports each and designed to selectively open or close a hydraulic connection between the drive port and the drive mechanism port respectively assigned to it, and an actuation valve which is designed to selectively reverse the hydraulic connection between a pressure side and return side of the drive port and corresponding sides of the drive mechanism ports. A mobile crane may include such an emergency-operation valve block.

15 Claims, 2 Drawing Sheets

(51) Int. Cl.

| | |
|---|---|
| ***B66C 23/88*** | (2006.01) |
| ***F15B 13/08*** | (2006.01) |
| ***F15B 20/00*** | (2006.01) |

(56) References Cited

U.S. PATENT DOCUMENTS

| | | | | |
|---|---|---|---|---|
| 8,950,733 | B2 * | 2/2015 | Collins | B66C 13/20<br>254/93 VA |
| 10,837,473 | B2 * | 11/2020 | Kawabuchi | F15B 20/002 |
| 2016/0185579 | A1 * | 6/2016 | Collins | B66C 13/20<br>254/93 VA |
| 2018/0257915 | A1 * | 9/2018 | Verkoyen | B66D 1/08 |
| 2019/0329819 | A1 * | 10/2019 | Shan | B62D 5/12 |

FOREIGN PATENT DOCUMENTS

| | | | |
|---|---|---|---|
| DE | 19646425 | A1 | 5/1998 |
| GB | 969019 | A1 | 9/1964 |

OTHER PUBLICATIONS

JP Office Action dated Oct. 6, 2024, issued in connection with corresponding JP Appl. No. JP 2023-118802.

* cited by examiner

EMERGENCY-OPERATION VALVE BLOCK FOR A MOBILE CRANE

FIELD

The present disclosure relates to a valve block by means of which, when the main power supply to the crane drive mechanisms fails, it is possible to ensure that hydraulic fluid can be supplied to the crane drive mechanisms via an independent emergency power supply. The present disclosure also relates to a mobile crane comprising such a valve block, using which the crane drive mechanisms can be supplied by means of an emergency power supply.

BACKGROUND

Crane functions such as for example lifting or lowering a load on the lifting cable, luffing the crane boom in or out and rotating the crane superstructure relative to the crane undercarriage are regularly performed by hydraulic units such as for example hydraulic motors or hydraulic cylinders in mobile cranes. The latter are in turn driven by hydraulic pumps to which they are connected via hydraulic conduits in order to be supplied with a volume flow of hydraulic fluid. In order to be able to continue to perform essential crane functions in the event of damage, it is desirable and sometimes even a legal requirement to provide a drive system which is independent of the main drive system.

So-called “transformers” represent an example of such an independent power supply and essentially consist of a gear motor-pump combination which can be driven by an external hydraulic power source and which delivers a drive output to a hydraulic gear pump. The external hydraulic power source can for example be provided by another crane or else by a hydraulic unit, a so-called “power pack”. The gear pump can for example retrieve hydraulic fluid from the superstructure tank of the receiving crane and provides the hydraulic pressure and volume flow for the drive mechanisms to be supplied. Since this does not involve the hydraulic main drive system, the drive mechanisms are driven at a reduced output. Previous emergency drive systems have then comprised a multitude of valves which have to be actuated manually in a precisely predetermined way in order to activate a desired drive mechanism in a desired way. These systems have previously also been individually adapted to a crane and are therefore constructed from a multitude of hydraulic components which are laid with pipes in a way which is often unclear to the operator. They therefore regularly exhibit an unsatisfactory tendency to leak and take up a not inconsiderable amount of installation space, while their unclear arrangement often leads to operating errors.

SUMMARY

It is an object of the present disclosure to remedy this and to provide a compact, low-maintenance device which is easy for an operator to understand and by means of which individual crane drive mechanisms can be hydraulically connected to and driven by an emergency drive.

This object is achieved by a valve block in accordance with the present disclosure, comprising the following components:

- a drive port for hydraulically connecting the valve block to an emergency drive of a mobile crane;
- at least two drive mechanism ports for hydraulically connecting the valve block to one drive mechanism of the mobile crane each;
- at least two closing valves, which are assigned to one of the drive mechanism ports each and designed to selectively open or close a hydraulic connection between the drive port and the drive mechanism port respectively assigned to it; and
- an actuation valve which is designed to selectively reverse the hydraulic connection between a pressure side and return side of the drive port and corresponding sides of the drive mechanism ports.

In accordance with the present disclosure, the individual valves are combined in a compact unit. Laying pipes or even tubes between the individual valves, as is the case with corresponding devices from the prior art, can thus be omitted. Instead, the individual valves and also other hydraulic components are hydraulically connected by channels formed in the body of the valve block, such that not only the maintenance costs but also the installation volume occupied by the valve system can be significantly reduced as compared to known systems in which pipe or tubes are laid between the valves.

The valve block which accommodates the individual valves need not then necessarily be embodied as a single-piece body, but can instead also be constructed modularly and comprise multiple module bodies which are hydraulically connected to each other. It is then for example possible to modify the valve block in accordance with the present disclosure in order to adapt it to different installation situations, for example for different types of crane in which the crane drive mechanisms can differ from each other in type and number. It is also then possible not only to detach individual hydraulic components from the rest of the valve block for maintenance or repair purposes, but also to replace them with new components.

In accordance with one embodiment, the valve block comprises a drive mechanism port for each of at least two of the following crane drive mechanisms:

- a slewing mechanism for rotating the crane superstructure relative to the crane undercarriage;
- a luffing mechanism for luffing the crane boom in and out;
- a lifting mechanism for lifting and lowering the load suspended on a lifting cable.

The valve block in accordance with the present disclosure can of course provide a drive mechanism port for any crane drive mechanisms in order to connect them to an emergency drive.

In accordance with another embodiment, the closing valves and/or the actuation valve are designed to be actuated by means of a hand lever, wherein actuating the closing valves is in particular designed such that simultaneously opening multiple closing valves is prevented.

It is then possible for each of the valves to comprise its own hand lever, using which the operating personnel can move the valve to a desired position. In order to avoid operating errors, the levers can then be designed such that one lever physically blocks the other respective levers as soon as it is moved by the operating personnel to a position in which the associated valve is open, i.e., in which the corresponding crane drive mechanism is connected to the emergency drive.

It is thus possible to ensure that a hydraulic connection only ever exists between the emergency drive and one crane drive mechanism respectively, and that consequently no uncontrolled positioning movements by other crane drive mechanisms can occur.

It is also possible to provide a common hand lever for the closing valves, wherein each of the closing valves comprises a tool interface to which the hand lever can be detachably coupled. In this way, too, it is possible to avoid a scenario in which multiple valves are simultaneously open and a hydraulic connection thus exists between multiple crane drive mechanisms and the emergency drive. Before the lever is connected to a valve which is to be opened, it must first be removed from the previously actuated valve, which provides another indication to the operating personnel to first close the previously actuated valve. In another measure, it would be possible to design the coupling between the jointly provided hand lever and the individual valves such that the hand lever can only be removed from the valves when they are in a closed position.

Operating the valve block can be further simplified by arranging and/or aligning the hand lever or the tool interfaces of the closing valves identically, in particular adjacently, on the valve block. This measure allows the operating personnel to identify all the available valves and/or their actuation levers simultaneously. If the valves are identically arranged, the respective actuation position of all the valves can also be identified simultaneously. The valves can for example be arranged such that a particular spatial direction of the hand lever and/or tool interface indicates the same actuation position, for example "open" or "closed", for all the valves.

It is also possible for the hand lever or the tool interfaces of the closing valves to be able to be mechanically fixed in their position, in particular in their position which closes the hydraulic connection between the drive port and the drive mechanism port respectively assigned to it. This prevents individual valves from being opened in an uncontrolled way.

In order to make the actuation position of the valves readily evident, the closing valves—in particular, their tool interfaces or hand lever—can exhibit a position indicator, specifically in the form of a recess or protrusion on the tool interface or hand lever. In particular when all the valves are arranged and/or aligned identically, the position of all the valves is immediately evident.

For opening and/or closing the hydraulic connection between the drive port and the respective drive mechanism ports, any suitable design of the valves is conceivable. Within the context of the present disclosure, rotary slide valves are a preferred embodiment of a closing valve because they are compact in design. These closing valves can also be formed as 6/2-way valves to which six hydraulic ports can be respectively connected in two different valve positions. Any suitable embodiments are also in principle conceivable for the actuation valve, although here again, a rotary slide valve is the preferred embodiment because it is compact. The actuation valve can also be formed as a 5/3-way valve which interconnects five hydraulic ports in three different positions.

The function of the closing valves respectively assigned to one of the drive mechanism ports is to open and/or close a hydraulic connection between the drive port and the respective drive mechanism port. A crane drive mechanism which is to be driven by the emergency drive can thus be "pre-selected" by means of the closing valves, wherein the actuation valve can be assigned not only the task of defining the movement direction or rotational direction of the crane drive mechanism which is respectively to be driven, but also that of providing an additional way of closing the hydraulic connection between the drive port and the respective drive mechanism ports, i.e., as soon as the crane drive mechanism which is to be driven has been selected by means of the closing valves, the hydraulic connection can be ultimately opened by opening the actuation valve in a direction corresponding to the desired movement direction of the crane drive mechanism, in order for the corresponding crane drive mechanism to be directly driven by the emergency drive. The movement direction of the crane drive mechanism depends on which of the hydraulic supply conduits of the drive mechanism is connected to a pressure side and/or return side of the drive port via the actuation valve. In order to utilize the function of the actuation valve for all the drive mechanism ports, the actuation valve can be arranged between the drive port and the closing valves in the hydraulic connection between the drive port and the drive mechanism ports. Alternatively, it is also possible to provide a separate actuation valve for each drive mechanism port, which are arranged between the corresponding closing valves and the drive ports assigned to them.

In other embodiments, the actuation valve can be designed to:

- supply a feed pressure to at least one of the closing valves, and in particular enable hydraulic fluid to circulate from the pressure side to the return side of the drive port, in a base position;
- supply a working pressure to the closing valves in an open position;
- supply a feed pressure to at least one of the closing valves, and in particular prevent the hydraulic fluid from circulating from the pressure side to the return side of the drive port, in an intermediate position situated in particular between the base position and one of the open positions.

The actuation valve can also be designed such that it does not supply a feed pressure to at least one of the closing valves in a base position.

For individual crane functions, the valve block can also comprise one or more lowering brake valves which prevent crane drive mechanisms from performing a return movement due to gravity. The valve block can then comprise at least one lowering brake valve which is designed to selectively open or close a hydraulic connection between the return sides of a corresponding drive mechanism port and the drive port. The actuation valve can also supply a working pressure to the lowering brake valve or valves.

In order to collect any leakage from valves, which can be designed as rotary slide valves, one embodiment of the valve block comprises at least one hydraulic connection which serves to return hydraulic fluid, which leaks from at least one of the closing valves and/or from the actuation valve, to the drive port.

Another aspect of the present disclosure relates to a mobile crane comprising an emergency drive, at least two crane drive mechanisms assigned in particular to the superstructure, and an emergency-operation valve block in one of the embodiments described above.

BRIEF DESCRIPTION OF THE DRAWINGS

Preferred embodiments of the present disclosure are explained in more detail below with reference to the accompanying figures. The present disclosure can comprise any of the features described here, individually and in any expedient combination. There is shown.

DESCRIPTION

Figure 1:
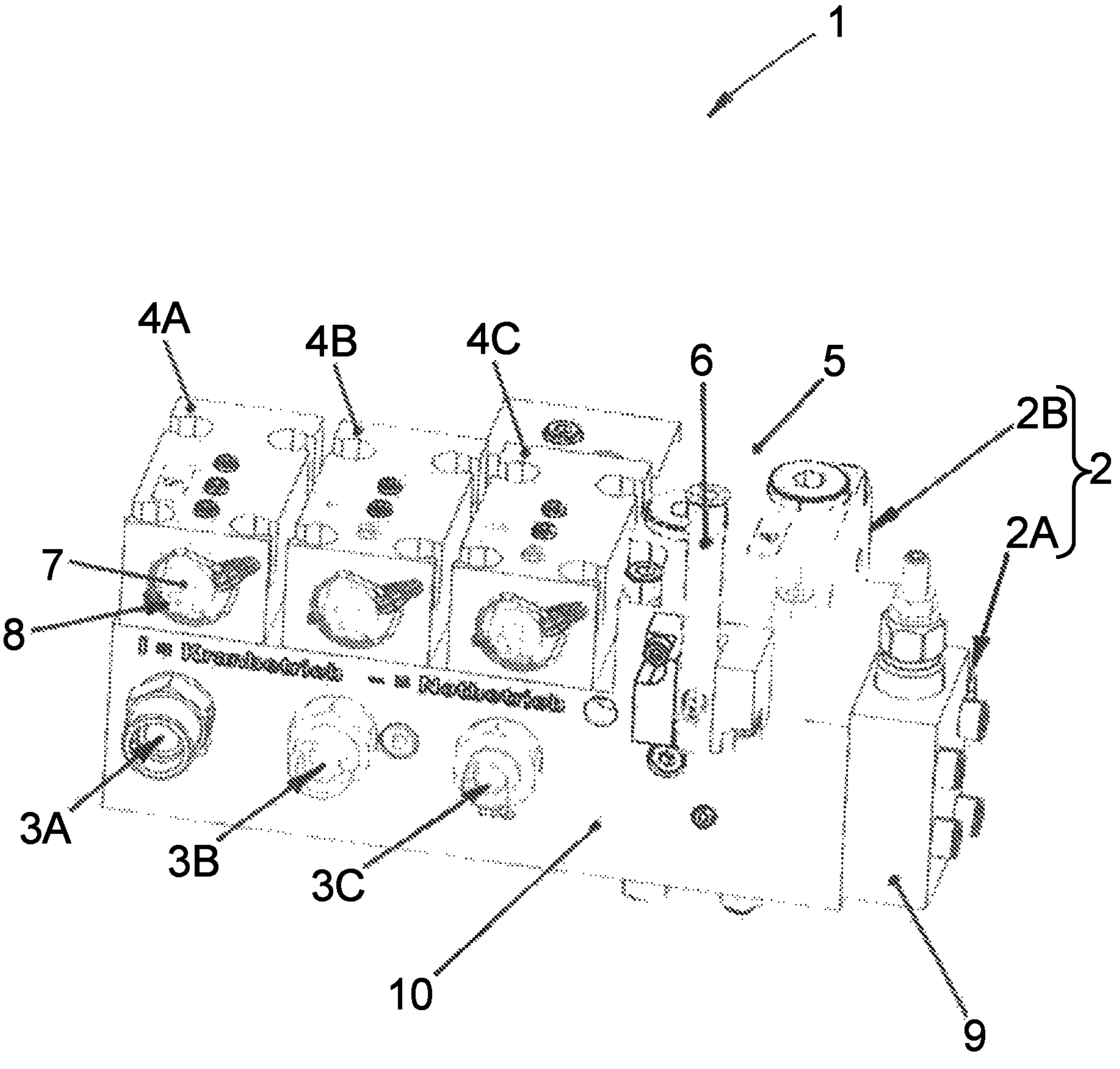
FIG. 1 a perspective view of an emergency-operation valve block in accordance with an embodiment.

FIG. 1 shows a valve block 1 in accordance with an embodiment comprising a base body 10 on which three closing valves 4A, 4B, 4C, an actuation valve 5 and a lowering brake valve 9 are mounted in such a way that their inner fluid channels are fluidically connected to those of the base body 10. It is thus unnecessary to lay pipes or tubes between the individual hydraulic components of the valve block 1 in accordance with the present disclosure. Instead, hydraulic fluid is in this case transferred "directly" between the individual components which are connected to each other via sealing contact surfaces.

The valve block shown in FIG. 1 comprises three identical closing valves 4A, 4B, 4C, each of which is assigned to a crane drive mechanism, for example a slewing mechanism, a luffing mechanism and a lifting mechanism of a mobile crane, and hydraulically connected to corresponding drive mechanism ports 3A, 3B, 3C for this purpose. The drive mechanism ports 3A, 3B, 3C, of which only the three arranged on the front side of the base body 10 are shown in FIG. 1, are in turn connected to the individual crane drive mechanisms, wherein the closing valves 4A, 4B, 4C are designed identically and also arranged in an identical alignment on the base body 10, such that they can be actuated by means of a hand lever (not shown) which can be detachably coupled to the respective tool interfaces 7. The position of each valve 4A, 4B, 4C is indicated by a slot 8 which is machined into the end face of the tool interface 7, wherein a legend affixed to the base body 10 provides an aid to interpreting the position of the slot 8: if the slot 8 is vertical in its installed position, the hydraulic connection to the drive mechanism port 3A, 3B, 3C is closed, which represents the usual position for normal crane operations. If the slot 8 is horizontal, the corresponding closing valve 4A, 4B, 4C is open, such that hydraulic fluid can be supplied to a crane drive mechanism connected to the corresponding drive mechanism port 3A, 3B, 3C in an emergency-operation mode. In order to prevent crane drive mechanisms from being supplied via the drive mechanism ports 3A, 3B, 3C in an uncontrolled way, the individual tool interfaces 7 can be mechanically locked in position when the valves 4A, 4B, 4C are in a closed position, for example by the folding pins shown in FIG. 1.

The valve block 1 also comprises an actuation valve 5 which is connected to each of the closing valves 4A, 4B, 4C on the one hand and to a drive port 2 on the other. Depending on the position of the hand lever 6, a hydraulic connection between the closing valves 4A, 4B, 4C and the drive port 2 is closed or open, wherein the pressure side 2A and the return side 2B of the drive port 2 are also assigned to the respective sides of the drive mechanism ports 3A, 3B, 3C via the actuation valve 5, so as to predetermine the movement direction of the crane drive mechanisms.

In order to prevent unintended, gravity-induced positioning movements by crane drive mechanisms, the valve block 1 comprises a lowering brake valve 9 for corresponding drive mechanism ports 3A, 3B, 3C.

As can be seen from FIG. 1, the closing valves 4A, 4B, 4C, the actuation valve 5 and the lowering brake valve 9 are screwed to the base body 10, wherein their respective contact surfaces seal off the fluid channels which extend through the respective module bodies. This modular construction of the valve block 1 not only enables individual components to be replaced quickly, but also enables different components to be selectively installed in accordance with the respective installation situation of the valve block 1, for example in different types of crane.

Figure 2:
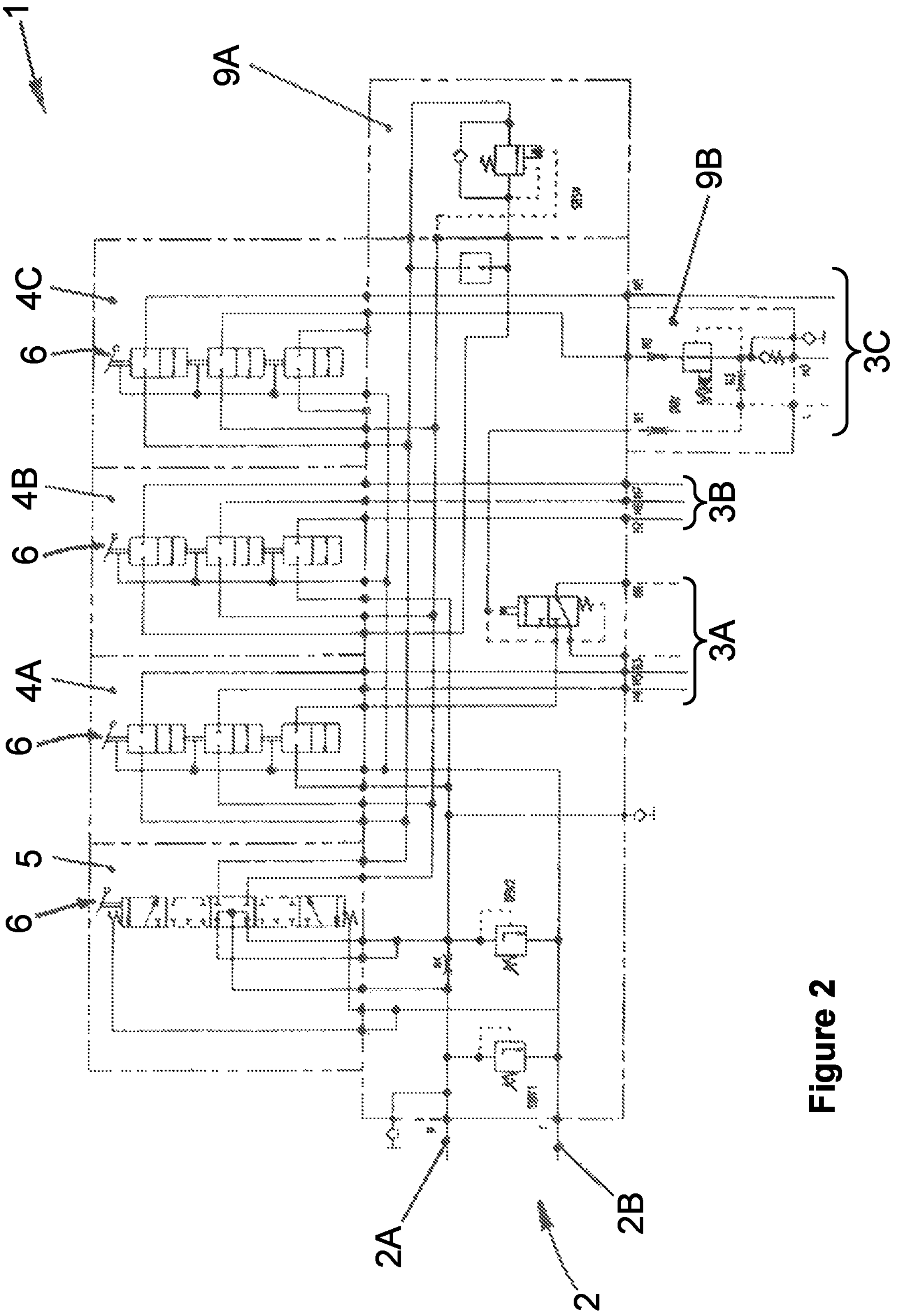
FIG. 2 a hydraulic circuit diagram of the valve block from FIG. 1.

FIG. 2 shows a hydraulic circuit diagram for the valve block 1 shown in FIG. 1. How the valve block 1 functions and is actuated shall be explained below with reference to FIG. 2.

Base Position

A volume flow of hydraulic fluid is provided by a transformer via the pressure side 2A of the drive port 2. In the base position of the actuation valve 5 shown in FIG. 2, the hydraulic fluid circulates on the pressure side 2A, wherein the pressure limiting valve DBV2 limits the feed pressure and opens at around 30 bars. When the actuation valve 5 is in the base position, the feed pressure is applied to all the closing valves 4A, 4B, 4C.

Functional Description of the Slewing Mechanism

When the closing valve 4A is opened, the feed pressure is applied via the closing valve 4A to the valve (not denoted) for connecting the slewing mechanism brake BR.

As soon as the actuation valve 5 is moved to its uppermost position and is thus open, a working pressure is applied to all the closing valves 4A, 4B, 4C. Hydraulic fluid passes through the open closing valve 4A to the slewing mechanism motors via the port H5 and causes the superstructure to be rotated. The returning hydraulic fluid from the motors passes back to the hydraulic tank via the port H4, the closing valve 4A, the actuation valve 5, the pressure limiting valve DBV2 and the return side 2B of the drive port 2, wherein the working pressure is limited to 195 bars by the pressure limiting valve DBV1.

Functional Description of the Lifting Mechanism

When the closing valve 4B is opened while the actuation valve 5 is closed, hydraulic fluid passes to the port H2 at the feed pressure, such that a lifting mechanism brake connected to it opens.

When the actuation valve 5 is opened (uppermost position), hydraulic fluid passes to the lifting mechanism motor at a high pressure, such that a load can be lifted. The returning hydraulic fluid from the motor flows back into the tank via the closing valve 4B, the actuation valve 5 and the pressure limiting valve DBV2, wherein the working pressure is limited to 195 bars by the pressure limiting valve DBV1.

In order to lower the load, the actuation valve 5 is moved to its lowest position, such that returning hydraulic fluid from the motor is applied to the lowering brake valve 9A. A working pressure is additionally applied to the lowering brake valve 9A, which opens due to this added pressure, via the pressure side 2A. The load-lifting hydraulic fluid can thus flow off towards the tank via the actuation valve 5 and the pressure limiting valve DBV2. The load is lowered. The returning hydraulic fluid from the motor passes back into the tank via the closing valve 4B, the actuation valve 5 and the pressure limiting valve DBV2.

Functional Description of the Luffing Mechanism

When luffing the crane boom in, hydraulic fluid passes through the open actuation valve 5 (uppermost position) at a high pressure through the open closing valve 4C up to the port H8 and the luffing cylinder connected to it. The luffing cylinder is consequently extended, and the boom rises. The returning hydraulic fluid from the cylinder flows back into the tank via a valve manifold of the crane (not shown).

For luffing the crane boom out, the actuation valve 5 is moved to its lowest position, such that hydraulic fluid passes up to the pressure-reducing valve 9B via the orifice N2. The luffing cylinder is slowly retracted and the boom lowered. The returning hydraulic fluid from the cylinder flows back into the tank via a valve manifold of the crane (not shown in this case).

The invention claimed is:

1. An emergency-operation valve block, comprising:

a drive port for hydraulically connecting the valve block to an emergency drive of a mobile crane;

at least two drive mechanism ports for hydraulically connecting the valve block to one drive mechanism of the mobile crane each;

at least two closing valves, which are respectively assigned to one of the drive mechanism ports of the at least two drive mechanism ports and designed to selectively open or close a hydraulic connection between the drive port and the respectively assigned drive mechanism port;

an actuation valve which is designed to selectively reverse the hydraulic connection between a pressure side and return side of the drive port and corresponding sides of the drive mechanism ports; and wherein the closing valves are designed to be actuated by a hand lever, wherein actuating the closing valves is designed such that simultaneously opening multiple closing valves is prevented.

2. The emergency-operation valve block according to claim 1, wherein a drive mechanism port of the at least two drive mechanism ports is provided for each of at least two of the following drive mechanisms:

a slewing mechanism for rotating a crane superstructure relative to a crane undercarriage;

a luffing mechanism for luffing a crane boom in and out; and a lifting mechanism for lifting and lowering a load suspended on a lifting cable.

3. The emergency-operation valve block according to claim 1, wherein the actuation valve is designed to be actuated by a hand lever.

4. The emergency-operation valve block according to claim 3, further comprising a hand lever provided jointly for the closing valves, wherein each of the closing valves comprises a tool interface to which the hand lever is configured to be detachably coupled.

5. The emergency-operation valve block according to claim 4, wherein the hand lever or the tool interfaces of the closing valves are arranged and/or aligned identically, on the valve block.

6. The emergency-operation valve block according to claim 4, wherein the hand lever or the tool interfaces of the closing valves are configured to be mechanically fixed in their position which closes the hydraulic connection between the drive port and the respectively assigned drive mechanism port.

7. The emergency-operation valve block according to claim 4, wherein the tool interfaces or hand lever of the closing valves exhibit a position indicator in the form of a recess or protrusion on the tool interface or hand lever.

8. The emergency-operation valve block according to claim 1, wherein at least one of the closing valves are formed as rotary slide valves and/or as 6/2-way valves.

9. The emergency-operation valve block according to claim 1, wherein the actuation valve is formed as a rotary slide valve and/or as a 5/3-way valve.

10. The emergency-operation valve block according to claim 1, wherein the actuation valve is arranged between the drive port and the closing valves in the hydraulic connection between the drive port and the drive mechanism ports.

11. The emergency-operation valve block according to claim 1, wherein the actuation valve is also designed to:

supply a feed pressure to at least one of the closing valves to enable hydraulic fluid to circulate from the pressure side to the return side of the drive port, in a base position; and/or supply a working pressure to the closing valves in an open position; and/or supply a feed pressure to at least one of the closing valves to prevent the hydraulic fluid from circulating from the pressure side to the return side of the drive port, in an intermediate position situated in particular between the base position and one of the open positions.

12. The emergency-operation valve block according to claim 11, wherein a feed pressure is not supplied to at least one of the closing valves when the actuation valve is in a base position.

13. The emergency-operation valve block according to claim 1, further comprising at least one lowering brake valve which is assigned to one of the drive mechanism ports and designed to selectively open or close a hydraulic connection between the return sides of the drive mechanism port and the drive port and to which the actuation valve supplies a working pressure.

14. The emergency-operation valve block according to claim 1, further comprising a hydraulic connection for returning hydraulic fluid, which leaks from at least one of the closing valves and/or from the actuation valve, to the drive port.

15. A mobile crane comprising:

an emergency drive;

at least two crane drive mechanisms assigned to a crane superstructure; and an emergency-operation valve block comprising:

a drive port for hydraulically connecting the valve block to the emergency drive;

at least two drive mechanism ports for hydraulically connecting the valve block to respective crane drive mechanisms of the at least two crane drive mechanisms;

at least two closing valves, which are respectively assigned to one of the drive mechanism ports of the at least two drive mechanism ports and designed to selectively open or close a hydraulic connection between the drive port and the respectively assigned drive mechanism port;

an actuation valve which is designed to selectively reverse the hydraulic connection between a pressure side and return side of the drive port and corresponding sides of the drive mechanism ports; and wherein the closing valves are designed to be actuated by a hand lever wherein actuating the closing valves is designed such that simultaneously opening multiple closing valves is prevented.

* * * * *